United States Patent [19]

Yasuda

[11] Patent Number: 4,861,811

[45] Date of Patent: Aug. 29, 1989

[54] DISPERSION OF LOW MOLECULAR WEIGHT POLYOLEFIN

[75] Inventor: Keiichi Yasuda, Joyo, Japan

[73] Assignee: Sanyo Chemical Industries, Ltd., Kyoto, Japan

[21] Appl. No.: 166,307

[22] Filed: Mar. 10, 1988

[30] Foreign Application Priority Data

Mar. 25, 1987 [JP] Japan .................................. 62-71209

[51] Int. Cl.$^4$ ............................................... C08K 3/20
[52] U.S. Cl. .................................... 523/501; 523/502; 524/458
[58] Field of Search ................. 523/501, 502; 524/458

[56] References Cited

U.S. PATENT DOCUMENTS

| | | | |
|---|---|---|---|
| 4,090,991 | 5/1978 | Fukusaki | 523/502 |
| 4,191,672 | 3/1980 | Salome | 523/502 |

FOREIGN PATENT DOCUMENTS 6087051 12/1979 Japan .
7008549 6/1980 Japan .
9223457 6/1983 Japan .

Primary Examiner—Joseph L. Schofer
Assistant Examiner—Peter D. Mulcahy
Attorney, Agent, or Firm—Wenderoth, Lind & Ponack

[57] ABSTRACT

A nonaqueous resin dispersion in which particles of a low molecular weight polyolefin are finely and uniformly dispersed, which dispersion is obtained by the polymerization of a vinyl monomer (C) in the presence of 20 to 90% by weight of a substantially saturated polymer (A), based upon the total weight of the reactants (A), (B) and (C), and a low molecular weight polyolefin (B) dispersed finely therein. The resin dispersions of the present invention contain the low molecular weight polyolefin finely and uniformly dispersed such that it has an average particle diameter of not more than 10μ and preferably not more than 1μ. According to the Invention, the polyolefin is more finely and uniformly dispersed than previous dispersions produced by mechanical melt-dispersion of low molecular weight polyolefin and a resin.

7 Claims, No Drawings

DISPERSION OF LOW MOLECULAR WEIGHT POLYOLEFIN

The present invention relates to a resin dispersion wherein a low molecular weight polyolefin has been finely and uniformly dispersed and a method for producing the resin dispersion.

A low molecular weight polyolefin is well known as a release agent for various resins, and imparts releasability to resins by dispersing it in the resins. Hitherto, low molecular weight polyolefin dispersions have been produced by mechanical melt-dispersion of a low molecular weight polyolefin and a resin.

This prior art, however, has a problem that a low molecular weight polyolefin cannot finely be dispersed.

The present inventors have made an extensive study to obtain a resin dispersion wherein a low molecular weight polyolefin has been finely and uniformly dispersed, and as a result, attained to the present invention.

That is, the present invention provides the dispersion of a low molecular weight polyolefin comprising polymerizing a vinyl monomer (C) in the coexistence of a substantially saturated polymer (A) and a low molecular weight polyolefin (B).

A representative method for producing the resin dispersion of the present invention is to polymerize a vinyl monomer (C) in the coexistence of a saturated polymer (A) and a low molecular weight polyolefin (B). In carrying out this method, the saturated polymer (A) is one which is not compatible with the low molecular weight polyolefin (B) and besides does not substantially react with the vinyl monomer (C), while the vinyl monomer (C) is selected so that the polymer produced by its polymerization is one which is not compatible with the low molecular weight polyolefin (B).

For the saturated polymer (A) suitable for the production of such dispersions, there are given resins having a weight average molecular weight of from 500 to 2,000,000 and a glass transition point of not lower than 0° C., for example polyester resins, styrene resins, styrene/acrylic resins, polyamide resins, epoxy resins, urethane resins, etc. These resins are described in "Chemistry of Fundamental Synthetic Resins" (new edition), published by Giho-do in November, 1975.

For (A), a substantially saturated polymer is used, and there cannot be used such polymers having an unsaturated group as to cause gelation on polymerizing the vinyl monomer (C) to fail to obtain good dispersions. Also, it is preferred that the molecule of the polymer (A) has a straight-chain structure.

For the aforementioned polyester resin, there may be used condensed polyesters of a polycarboxylic acid component with a polyhydric alcohol component. The former component includes for example aromatic dicarboxylic acids (e.g. terephthalic acid, isophthali acid, phthalic acid), aliphatic dicarboxylic acids (e.g. succinic acid, adipic acid, sebacic acid) and trivalent or more-valent polycarboxylic acids (e.g. trimellitic acid, pyromellitic acid), and the latter component includes for example adducts of a bisphenol (e.g. bisphenol A, bisphenol S) with from 2 to 50 moles of an alkylene oxide [e.g. ethylene oxide (hereinafter referred to as EO), propylene oxide (hereinafter referred to as PO)], aliphatic glycols (e.g. ethylene glycol, propylene glycol, 1,3-butylene glycol, neopentyl glycol) and trihydric or more-hydric polyalcohols (e.g. glycerin, trimethylolpropane, pentaerythritol, sorbitol).

Specific examples of the polyester resin include polyesters of terephthalic acid with a bisphenol/2 moles EO adduct, polyesters of terephthalic acid with a bisphenol/2 moles PO adduct, and polyesters of terephthalic acid and isophthalic acid with neopentyl glycol, etc.

The weight average molecular weight of the foregoing polyester resins is usually from 3,000 to 500,000, preferably from 5,000 to 200,000. The acid value (mgKOH/g) of the resins is usually not more than 30, preferably not more than 10, and the hydroxyl value (mgKOH/g) thereof is usually not more than 50, preferably not more than 20.

For the styrene resin, there can be used styrene polymers and copolymers of styrene with a few amount (usually from 1 to 30% based on the weight of copolymers) of α-methylstyrene.

The weight average molecular weight of the foregoing styrene resins is usually from 3,000 to 1,000,000, preferably from 5,000 to 500,000.

For the styrene/acrylic resin, there may be given copolymers obtained from styrene and/or a few amount (usually from 1 to 30% based on the weight of styrene) of α-methylstyrene, and a methacrylates and/or acrylates. A term "methacrylate and/or acrylate" is referred to as (meth)acrylate hereinafter, and it includes methyl (meth)acrylate, ethyl (meth)acrylate, propyl (meth)acrylate, butyl (meth)acrylate, 2-ethylhexyl (meth)acrylate, lauryl (meth)acrylate, stearyl (meth)acrylate, etc.

The styrene content of these styrene/acrylic resins is usually not less than 40% by weight, preferably not less than 50% by weight.

The weight average molecular weight of thestyrene/acrylic resins is from 1,000 to 1,000,000, preferably from 3,000 to 500,000.

For the polyamide resin, there may be given ring-opened polymers of cyclic amides (e.g. ε-caprolactam), dehydrate condensates of amino acids, condensates of a dicarboxylic acid with a diamine, etc. The dicarboxylic acid includes aromatic dicarboxylic acids such as terephthalic acid, isophthalic acid, phthalic acid, etc., and aliphatic dicarboxylic acids such as succinic acid, adipic acid, sebacic acid, dimer acid, etc. The diamine includes aromatic diamines such as xylylenediamine, m-phenylenediamine, etc., and aliphatic diamines such as ethylenediamine, diethylenetriamine, triethylenetetramine, tetraethylenepentamine, hexamethylenediamine, etc.

The weight average molecular weight of the foregoing polyamide resins is usually from 1,000 to 2,000,000, preferably from 2,000 to 500,000.

The epoxy resin includes glycidyl type ones (e.g. bisphenol type, novolak type, alkylphenol type, resorcinol type) and non-glycidyl type ones (e.g. alicyclic epoxides).

The weight average molecular weight of the foregoing epoxy resins is from 800 to 100,000, preferably from 900 to 50,000.

When the epoxy resin is used, low molecular weight polyolefins having no functional group which can react with an epoxy group, for example polyethylene, polypropylene, copolymers of ethylene with α-olefin (usually having from 3 to 8 carbon atoms), etc. are used as the low molecular weight polyolefin (B).

Further, for the vinyl monomer (C), there are used vinyl monomers having no functional group which can react with an epoxy group such as an amine group, carboxyl group, etc.

The urethane resin includes urethane resins of an organic polyisocyanate with a polyol.

For the organic polyisocyanate, there may be given aromatic polyisocyanates [e.g. p-phenylenediisocyanate, 2,4-tolylenediisocyanate (TDI), 4,4'-diphenylmethanediisocyanate (MDI), xylylenediisocyanate], aliphatic polyisocyanates (e.g. hexamethylenediisocyanate, lysinediisocyanate), alicyclic polyisocyanates (e.g. hydrogenated TDI, hydrogenated MDI, isophoronediisocyanate), etc.

For the polyol, there may be given high molecular weight polyols such as polyether polyols [ring-opened polymers of EO, PO, tetrahydrofuran, etc., and adducts obtained by the addition of an alkylene oxide (e.g. EO, PO, butylene oxide) to an active hydrogencontaining copound (e.g. low molecular weight polyols, amines, phenols)]and polyester polyols [polyester diols of a polycarboxylic acid (e.g. adipic acid, sebacic acid) with a polyol (e.g. ethylene glycol, propylene glyocl) and ring-opened polymers of a lactone], and low molecular weight polyols (e.g. ethylene glycol, propylene glycol, butylene glycol, hexamethylene glycol, glycerin, trimethylolpropane, pentaerythritol), etc.

The weight average molecular weight of the foregoing urethane resins is from 500 to 1,000,000, preferably from 1,000 to 500,000.

Among the polymer (A), preferred ones are polyester resins, styrene resins and polyamide resins, and particularly preferred ones are straight-chain polyester resins.

For the low molecular weight polyolefin (B), there may be given the followings having a weight average molecular weight of usually from 500 to 100,000, preferably from 1,000 to 70,000: (1) Polyethylene, polypropylene and copolymers of ethylene with α-olefin having usually from 3 to 8 carbon atoms (for example, those of which the ethylene content is not less than 50% by weight, particularly not less than 70% by weight), (2) adducts obtained from the polymers or copolymers described in (1) and maleic acid derivatives (e.g. maleic anhydride, maleic acid, the dimethyl ester, diethyl ester and di-2-ethylhexyl ester of the acid), (3) oxides of the polymers or copolymers described in (1), and (4) copolymers of an ethylenically unsaturated carboxylic acid [e.g. (meth)acrylic acid, itaconic acid ] and/or its ester (e.g. $C_1$-$C_{18}$ alkyl ester) with an ethylenically unsaturated hydrocarbon (e.g. ethylene, propylene, butene-1).

Of the foregoing low molecular weight polyolefins, those which are described in (1) are obtained by thermal depolymerization thermal decomposition) of high molecular weight polyolefins (usually having a molecular weight of from 10,000 to 2,000,000) or homopolymerization of copolymerization of an olefin.

Those which are described in (2) are obtained by addition reaction of a low molecular weight polyolefin with a maleic acid derivative in the presence or absence of a peroxide catalyst.

Those which are described in (3) are obtained by oxidation of low molecular weight polyolefins with oxygen, oxygen-containing gas (air), ozone-containing oxygen or ozone-containing gas (air). The acid value of the oxides is usually not more than 100, preferably not more than 50.

Those which are described in (4) are obtained by copolymerization of an ethylenically unsaturated carboxylic acid and/or its $C_1$-$C_{18}$ alkyl ester with an ethylenically unsaturated hydrocarbon. The amount of the ethylenically unsaturated carboxylic acid and/or its alkyl ester is usually not more than 30% by weight, preferably not more than 20% by weight.

The vinyl monomer (C) used in the present invention includes aromatic hydrocarbon series vinyl monomers (e.g. styrene, α-methylstyrene), α,β-unsaturated carboxylic acid esters [.e.g. methyl (meth)acrylate, ethyl (meth)acrylate, propyl (meth)acrylate, butyl (meth)acrylate, 2-ethylhexyl (meth)acrylate, lauryl (meth)acrylate, stearyl (meth)acrylate, hydroxyethyl (meth)acrylate, hydroxypropyl (meth)acrylate, glycidyl (meth)acrylate, cyclohexyl (meth)acrylate, tetrahydrofurfuryl (meth)acrylate, dimethylaminoethyl (meth)acrylate, diethylaminoethyl (meth)acrylate], α,β-unsaturated carboxylic acids [e.g. (meth)acrylic acid, maleic acid, itaconic acid, fumaric acid] and two or more of them.

Of these vinyl monomers, preferred ones include styrene, methyl acrylate, ethyl acrylate, butyl acrylate, butyl methacrylate and 2-ethylhexyl acrylate.

The weight ratio of (B) to (C) is from 9:1 to 1:9, preferably from 5:5 to 2:8.

The amounts of (A), (B) and (C) based on the total amount of (A), (B) and (C) are as follows : The amount of (A) is usually from 20 to 90%, preferably from 30 to 70%. When the amount is less than 20%, the practical value becomes poor in terms of the properties of resin, while when it exceeds 90%, the amount of (B) becomes too small for a full release effect.

The amount of (B) is usually from 0.1 to 50%, preferably from 1 to 30%. When the amount is less than 0.1%, the release effect becomes poor, while when it exceeds 50%, the dispersibility becomes poor.

The amount of (C) is from 1 to 80%, preferably from 10 to 50%. When the amount is less than 1%, the dispersion of (B) is insufficient, while when it exceeds 80%, the practical value becomes poor in terms of the properties of resin.

The amount of (C) is determined depending upon the object of use or demanding properties. For example, when it is desired to keep the physical properties of (A) as unchanged as possible, (C) is used in a minimum amount necessary to obtain a fine dispersion of (B) [for example, when the dispersion is used in resin pellets for molding electrical goods, etc., the amount of (C) is from 10 to 30%]. However, when composites containing a large amount of (C) are more preferred in terms of the physical properties, etc., dispersions containing a large amount of (C) are prepared (for example, when the dispersion is used as a pigment dispersing medium for polyethylene resins, polypropylene resins, etc., the amount of (C) is from 20 to 50%).

The polymerization of the vinyl monomer is carried out in the coexistence of the polymer (A) having substantially no functional group which can react with the vinyl monomer and the low molecular weight polyolefin (B). If necessary, the polymerization is carried out in the presence of a solvent.

The solvent includes aromatic hydrocarbon solvents (e.g. toluene, xylene), chlorine-containing solvents (e.g. chloroform, carbon tetrachloride, dichloroethyl, tetrachloroethyl), and mixtures of two or more of them.

The amount of the solvent used is usually from 50 to 1000%, preferably from 100 to 400% based on the total amount of (A) and (B). When the amount is less than 50%, the dispersion of (B) is insufficient, while when it exceeds 1000%, the efficiency is poor.

Usually, a polymerization initiator is used in the polymerization, and it includes nitrile type initiators (e.g. azobisisobutyronitrile, azobisisovaleronitrile), peroxide type initiators (e.g. benzoyl peroxide, lauroyl peroxide, di-tert-butyl peroxide, tertbutyl cumyl peroxide, dicumyl peroxide).

The polymerization is usually carried out in an inert gas atmosphere such as nitrogen. The polymerization temperature is usually from 50° to 200° C., preferably from 80° to 150° C. When the temperature is lower than 50° C., (B) does not dissolve so that its dispersion is insufficient, while when it exceeds 200° C., there is a fear of the polymer being decomposed.

The reaction time is not particularly limited, but it is usually from 1 to 50 hours, preferably from 2 to 10 hours. When the reaction time is within 1 hour, reaction control is often difficult, while reaction times exceeding 50 hours are economically disadvantageous.

When the solvent is used in the polymerization, it is usually removed. Removal of the solvent is carried out under normal pressure or reduced pressure.

The low molecular weight polyolefin dispersion thus obtained is usually a white to brown solid. Its softening point is usually from 50° C. to 250° C. or higher. Microscopic observation of the low molecular weight polyolefin in this dispersion shows that the average particle diameter of the polyolefin is usually not more than $10\mu$, and that it is not more than $1\ \mu$ many cases.

The present invention will be illustrated in more detail with reference to the following examples and comparative examples, but it is not limited to these examples. In the examples, parts are by weight.

EXAMPLE 1

Sixty parts of a saturated polyester obtained from terephthalic acid and a bisphenol/2.2 moles EO adduct and 10 parts of a low molecular weight polypropylene (weight average molecular weight, 8600) were dissolved in 100 parts of toluene. After replacing air in the system by nitrogen, the resulting solution was heated to the refluxing temperature of toluene. To this solution was added dropwise a mixture comprising a solution of 1.5 parts of azobisisobutyronitrile in 21 parts of styrene and 9 parts of n-butyl acrylate, and polymerization was carried out at a temperature of 110° C. Toluene was removed by vaporization to obtain a pale yellow and solid-form low molecular weight polypropylene dispersion. The particle diameter of the low molecular weight polypropylene contained in this dispersion was microscopically observed to find that the average particle diameter was not more than 0.1 $\mu$.

EXAMPLE 2

Thirty parts of the same saturated polyester as used in Example 1 and 5 parts of the same low molecular weight polypropylene as used in Example 1 were dissolved in 100 parts of toluene. To this solution was added dropwise a mixture comprising 48 parts of styrene, 12 parts of n-butyl acrylate and 3 parts of azobisisobutyronitrile, and polymerization was carried out at a temperature of 110° C. Toluene was removed by vaporization to obtain a low molecular weight polypropylene dispersion. The average particle diameter of the low molecular weight polypropylene contained in this dispersion was not more than 0.1 $\mu$.

COMPARATIVE EXAMPLE 1

Sixty parts of the same saturated polyester as used in Example 1 and 10 parts of the same low molecular weight polypropylene as used in Example 1 were mechanically mixed on a laboratory plastomill (product of Toyo Seikiki Co., Ltd.) at a rate of 100 rpm under a condition of 130° C.×60 minutes to obtain a low molecular weight polypropylene dispersion. The average particle diameter of the low molecular weight polypropylene contained in this dispersion was $50\mu$.

COMPARATIVE EXAMPLE 2

A mixture comprising 210 parts of styrene, 90 parts of n-butyl acrylate and 15 parts of azobisisobutyronitrile was added dropwise to 1000 parts of toluene and polymerized at a temperature of 110° C. Thereafter, toluene was removed by vaporization to obtain a styrene/n-butyl acrylate copolymer. Thirty parts of this copolymer, 60 parts of the same saturated polyester as used in Example 1 and 10 parts of the same low molecular weight polypropylene as used in Example 1 were mechanically mixed on a laboratory plastomill at a rate of 100 rpm under a condition of 130° C.×60 minutes to obtain a low molecular weight polypropylene dispersion. The average particle diameter of the low molecular weight polypropylene contained in this dispersion was 60 $\mu$.

COMPARATIVE EXAMPLE 3

Thirty parts of the styrene/n-butyl acrylate copolymer obtained in Comparative example 2, 60 parts of the same saturated poyester as used in Example 1 and 10 parts of the same low molecular weight polypropylene as used in Example 1 were added to 100 parts of toluene, and the resulting mixture was stirred under reflux for 5 hours. On removing toluene by vaporization, it was found that the product separated into two layers during cooling.

According to the method of the present invention, there can be obtained a dispersion wherein a low molecular weight polyolefin has finely been dispersed in a polymer. Such a dispersion cannot be obtained by the conventional mechanical mixing method, and yet, the average particle diameter of the polyolefin is for example about 50 $\mu$. According to the present invention, however, there can be obtained dispersions wherein a low molecular weight polyolefin has been dispersed extremely finely in an average particle diameter of for example about 0.1 $\mu$.

Also, dispersions which are stable through the passage of time can be obtained by the present invention. That is, there is no phase separation through the passage of time. Further, production is easy as compared with the conventional mechanical mixing method.

Because of the effects described above, dispersions obtained by the present invention are useful as a self-releasable resin or an additive in various application fields, for example electric appliances such as switch covers, switch boxes, battery boxes, etc., sound appliances such as speaker boxes, etc., materials for exterior parts of automobiles such as bumpers, fenders, door panels, etc., and parts of air planes such as casings for air filters, baggage shelves, dash boards, etc. Also, the dispersions of the present invention find wide applications as a flatting agent for flat paints, abrasion resistance improving agent for gravure inks, pigment dispersing medium for toner resins for dry copying machines, polyethylene resins, polypropylene resins, AS resins, ABS resins, etc., and softening point improving agent for paraffin waxes, ethylene/vinyl acetate resins, etc.

What is claimed is:

1. A nonaqueous resin dispersion wherein particles of a low molecular weight polyolefin (B) are finely and uniformly dispersed, said dispersion being obtained by the polymerization of styrene and/or (meth)acrylate having an alkyl group of $C_1$–$C_8$ carbon atoms (C) in the presence of 20 to 90 % by weight of a polyester resin (A) based on the total weight of (A), (B) and (C), and said low mlecular weight polyolefin (B).

2. A nonaqueous resin dispersion according to claim 1, wherein the dispersed polyolefin has an average particle diameter of not more than $10\mu$.

3. A nonaqueous resin dispersion according to claim 1, wherein the dispersed polyolefin has an average particle diameter of not more than $1\mu$.

4. A nonaqueous resin dispersion according to claim 1 or 3, wherein the polyolefin (B) is a low molecular weight polypropylene.

5. A nonaqueous resin dispersion according to claim 1 or 3, wherein the amount of the polyolefin (B) is 0.1 to 50% by weight based on the total weight of reactants (A), (B) and (C).

6. A nonaqueous resin dispersion according to claim 1, wherein the polymer (A) is a polyester resin, polymer (B) is a low molecular weight polypropylene in amounts of 0.to 50% based upon the total weight of (A), (B) and (C) and the vinyl monomer (C) is styrene and/or (meth)acrylate having an alkyl group of $C_1$–$C_{18}$ carbon atoms and the dispersed polupropylene has an average particle diameter of not more than $10\mu$.

7. A method of producing a nonaqueous resin dispersion wherein the particles of a low molecular weight polyolefin (B) are finely and uniformly dispersed, which comprises polymerizing a vinyl monomer (C) in the presence of 20 to 90 % by weight of substantially saturated polymer (A) based on the total weight of (A), (B) and (C), and a low molecular weight polyolefin (B).

* * * * *